US012619287B2

(12) United States Patent
Nakanishi et al.

(10) Patent No.: US 12,619,287 B2
(45) Date of Patent: May 5, 2026

(54) CONNECTION STRUCTURE AND ELECTRONIC APPARATUS

(71) Applicant: LENOVO (SINGAPORE) PTE. LTD., Singapore (SG)

(72) Inventors: So Nakanishi, Yokohama (JP); Tatsuya Ushioda, Yokohama (JP); Takehito Yamauchi, Yokohama (JP); Xueyong Yang, Yokohama (JP); Taro Minobe, Yokohama (JP); Jun Iwasaki, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 197 days.

(21) Appl. No.: 18/628,291

(22) Filed: Apr. 5, 2024

(65) Prior Publication Data

US 2024/0393838 A1    Nov. 28, 2024

(30) Foreign Application Priority Data

May 24, 2023    (JP) ................................. 2023-085189

(51) Int. Cl.
*G06F 1/16* (2006.01)
*H01R 12/62* (2011.01)

(52) U.S. Cl.
CPC .......... *G06F 1/1658* (2013.01); *G06F 1/1684* (2013.01); *H01R 12/62* (2013.01); *H01R 2201/06* (2013.01)

(58) Field of Classification Search
None
See application file for complete search history.

(56) References Cited

U.S. PATENT DOCUMENTS

| | | | | |
|---|---|---|---|---|
| 8,947,884 | B1* | 2/2015 | Grimm .................... | H05K 5/00 |
| | | | | 361/756 |
| 2008/0174951 | A1* | 7/2008 | Mundt .................. | G06F 1/1662 |
| | | | | 361/679.41 |
| 2010/0046187 | A1* | 2/2010 | Murakami ........... | G06F 1/1658 |
| | | | | 361/803 |
| 2014/0071081 | A1* | 3/2014 | Shedletsky ............... | G06F 1/18 |
| | | | | 361/767 |
| 2023/0251687 | A1* | 8/2023 | Baek ..................... | G06F 1/1683 |
| | | | | 361/679.27 |

FOREIGN PATENT DOCUMENTS

| | | |
|---|---|---|
| JP | 2020068168 A | 4/2020 |
| JP | 2021196720 A | 12/2021 |

* cited by examiner

*Primary Examiner* — Krystal Robinson
(74) *Attorney, Agent, or Firm* — SHIMOKAJI IP

(57) ABSTRACT

A connection structure connects an electronic board and another electronic board by a flat cable. An inclined part of the flat cable is linearly formed in an A-direction inclined relative to an X-direction and a Y-direction. In the inclined part, ridge fold lines that protrude toward the surface on a Z1 side and valley fold lines that protrude toward the surface on a Z2 side are formed along a B-direction that is orthogonal to the A-direction. A connector connected to the flat cable in the electronic board and another connector connected to the flat cable in another electronic board have shapes elongated in the X-direction, and the positions of the connector and the another connector are shifted in the X-direction and the Y-direction.

7 Claims, 6 Drawing Sheets

CONNECTION STRUCTURE AND ELECTRONIC APPARATUS

BACKGROUND OF THE INVENTION

Field of the Invention

The present invention relates to a connection structure for connecting a first connection object and a second connection object by a flat cable, and an electronic apparatus provided with the connection structure.

Description of the Related Art

A flat cable such as an FPC is highly flexible and bendable, provides a high degree of freedom in wiring, and is also thin, so that a flat cable is sometimes applied to an electronic apparatus having a flat chassis such as a laptop personal computer.

The laptop personal computer described in Japanese Patent No. 6922037 has a main body chassis and a display chassis, which are connected using a flat cable. In the main body chassis, the flat cable has an S-shaped extra length portion, which accommodates changes in path length caused by opening and closing of the display chassis. The main body chassis is slightly thicker than the display chassis, and has enough room to form the S-shaped extra length portion.

SUMMARY OF THE INVENTION

The relative positions of connectors at both ends to which an FPC is connected inside a flat chassis may be slightly misaligned along a flat surface due to assembly errors or the like. An FPC is desirably provided with an extra length portion to accommodate such misalignment.

The extra length portion in Japanese Patent No. 6922037 is formed to have the S-shape on the section in the direction of thickness of the main body chassis inside the chassis. Forming such an extra length portion inside the display chassis would increase the thickness thereof accordingly, which is contrary to the demand for thinning. An S-shape could be formed as an extra length portion along the flat surface; however, this would make the FPC considerably longer, which would be contrary to the efforts for shortening signal lines required by recent communication standards and the like.

The present invention has been made in view of the above-described problems, and it is an object of the invention to provide a connection structure and an electronic apparatus that are capable of accommodating the misalignment between a first connection object and a second connection object in a narrow space, and of connecting with a shorter path.

To solve the above-described problems and to achieve the object, a connection structure according to a first aspect of the present invention is a connection structure for connecting a first connection object and a second connection object by a flat cable, wherein the flat cable has a ridge fold line that protrudes toward one surface and a valley fold line that protrudes toward the other surface, the ridge fold line and the valley fold line being formed along a direction intersecting with an extending direction.

An electronic apparatus according to a second aspect of the present invention is an electronic apparatus having a flat display chassis including a display and a rear cover that covers a surface opposite from a display surface of the display, the electronic apparatus including a flat cable that connects a first connection object and a second connection object in a space between the display and the rear cover, wherein the flat cable has a ridge fold line that protrudes toward one surface and a valley fold line that protrudes toward the other surface, the ridge fold line and the valley fold line being formed along a direction intersecting with an extending direction.

According to the above-described aspects of the present invention, misalignment between a first connection object and a second connection object can be accommodated in a narrow space, and connection can be accomplished with a shorter path.

DETAILED DESCRIPTION OF THE INVENTION

The following will describe in detail an embodiment of the connection structure and the electronic apparatus in accordance with the present invention on the basis of the accompanying drawings. It should be noted that the present invention is not limited by the embodiment.

Figure 1:
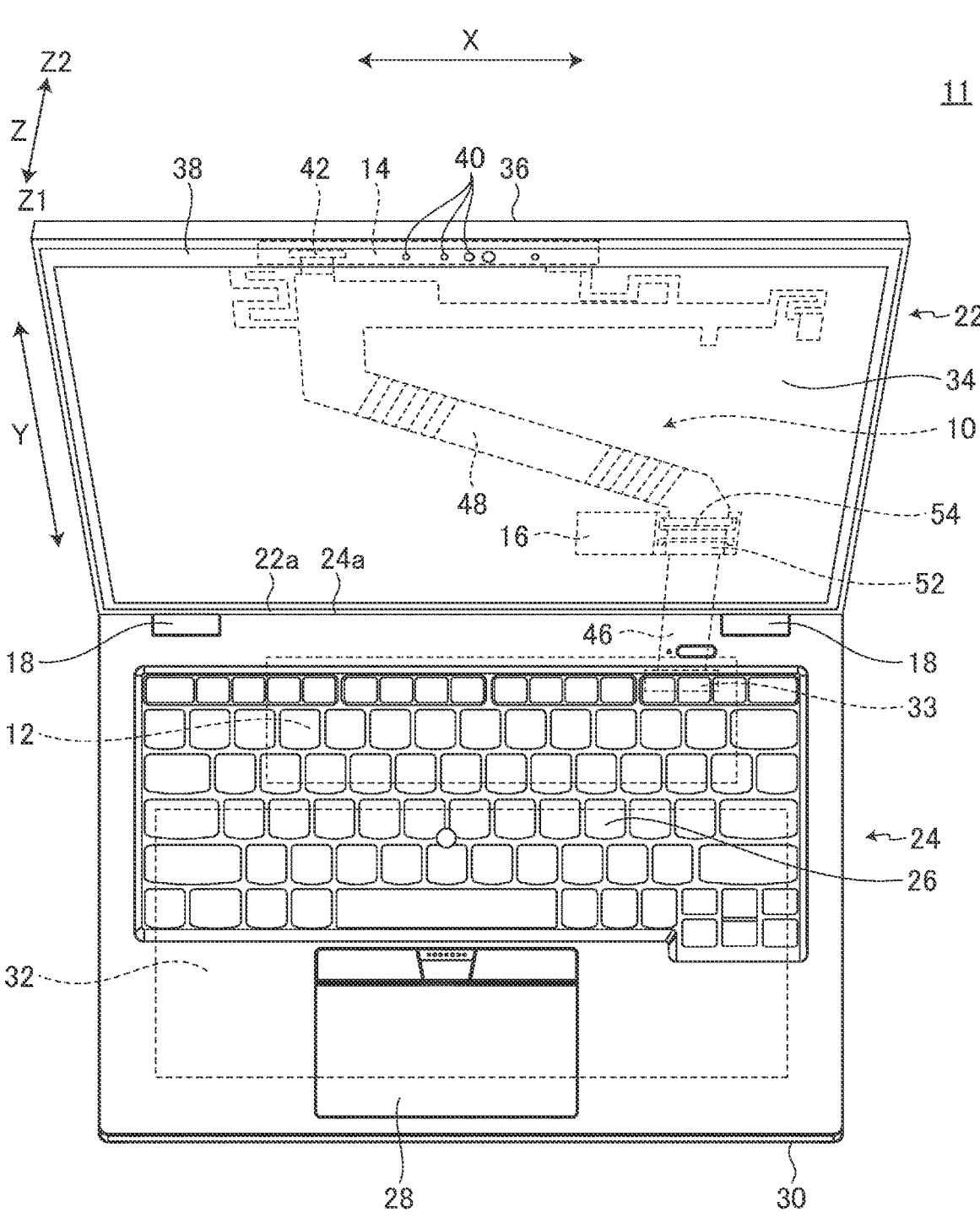
FIG. 1 is a perspective view of an electronic apparatus to which the connection structure according to an embodiment of the present invention has been applied.

FIG. 1 is a perspective view of a connection structure 10 and an electronic apparatus 11 according to an embodiment of the present invention. Although the electronic apparatus 11 illustrated herein is a laptop PC, the connection structure according to the present invention can be also applied to other electronic apparatuses such as a tablet PC, a mobile phone, a smartphone, or a portable game machine.

FIG. 1 illustrates a state in which a display chassis 22 has been opened through hinges 18 from a main body chassis 24. As illustrated in FIG. 1, the electronic apparatus 11 has a configuration in which a connection edge 22a, which is the lower edge of the display chassis 22, and a connection edge 24a, which is the rear edge of the main body chassis 24, are rotatably connected through a pair of the left and right hinges 18, 18.

The main body chassis 24 is a thin, rectangular box. A keyboard 26 and a touchpad 28 are provided on the upper surface of the main body chassis 24. The bottom surface of the main body chassis 24 is covered by a bottom surface cover 30. An electronic board 12, a battery 32, and the like are provided inside the main body chassis 24. The electronic board 12 is a motherboard controlling the entire electronic apparatus 11. A connector 33 is mounted on the electronic board 12.

The display chassis 22 is a horizontally long, flat, and rectangular box, and has a display 34, a rear cover 36 that covers the back surface of the display 34, and a bezel 38 that surrounds the periphery of the display 34. In the description of the display chassis 22 and the components thereof, the lateral direction will be referred to also as an X-direction, and the longitudinal direction orthogonal thereto will be referred to also as a Y-direction. The direction of the thickness of the display chassis 22 will be referred to also as a Z-direction, the display surface side of the display 34 will be referred to also as a Z1-direction, and the opposite side, which is the rear cover 36 side will be referred to also as a Z2-direction.

The display 34 is composed of, for example, an organic EL or a liquid crystal. A plurality of electronic devices 40 are provided approximately at the center of the upper side of the bezel 38. The electronic devices 40 are a camera, a microphone, an infrared device, and the like. The electronic devices 40 are mounted on an electronic board (a first connection object) 14 placed on the back of the bezel 38. In other words, the electronic board 14 can also be referred to as a device board. The electronic board 14 further has a connector (a first connection) 42 mounted thereon. Inside the display chassis 22, an electronic board (a second connection object) 16 is provided between the display 34 and the rear cover 36. The rear cover 36 has a plane part 36a occupying substantially the entire surface thereof and an edge frame part 36b that slightly protrudes. The electronic board 16 is adhesively fixed to the plane part 36a. The edge frame part 36b is the surface to which the bezel 38 is attached.

The electronic board 16 is placed on the lower right side relative to the center position inside the display chassis 22. The electronic board 16 is formed into a small, thin and rectangular shape that is slightly elongated in the lateral direction, and can be placed in a narrow space between the display 34 and the rear cover 36. Chips and the like for controlling the electronic devices 40 are mounted on the electronic board 16. Connectors 52, 54 are mounted on the electronic board 16. A flat cable 46 is connected to the connector 52. The other end of the flat cable 46 is connected to the connector 33 of the electronic board 12. A flat cable 48 is connected to the connector (a second connection) 54. The other end of the flat cable 48 is connected to the connector 42 of the electronic board 14. The flat cables 46, 48 are FPCs (Flexible Printed Circuits).

Figure 2:
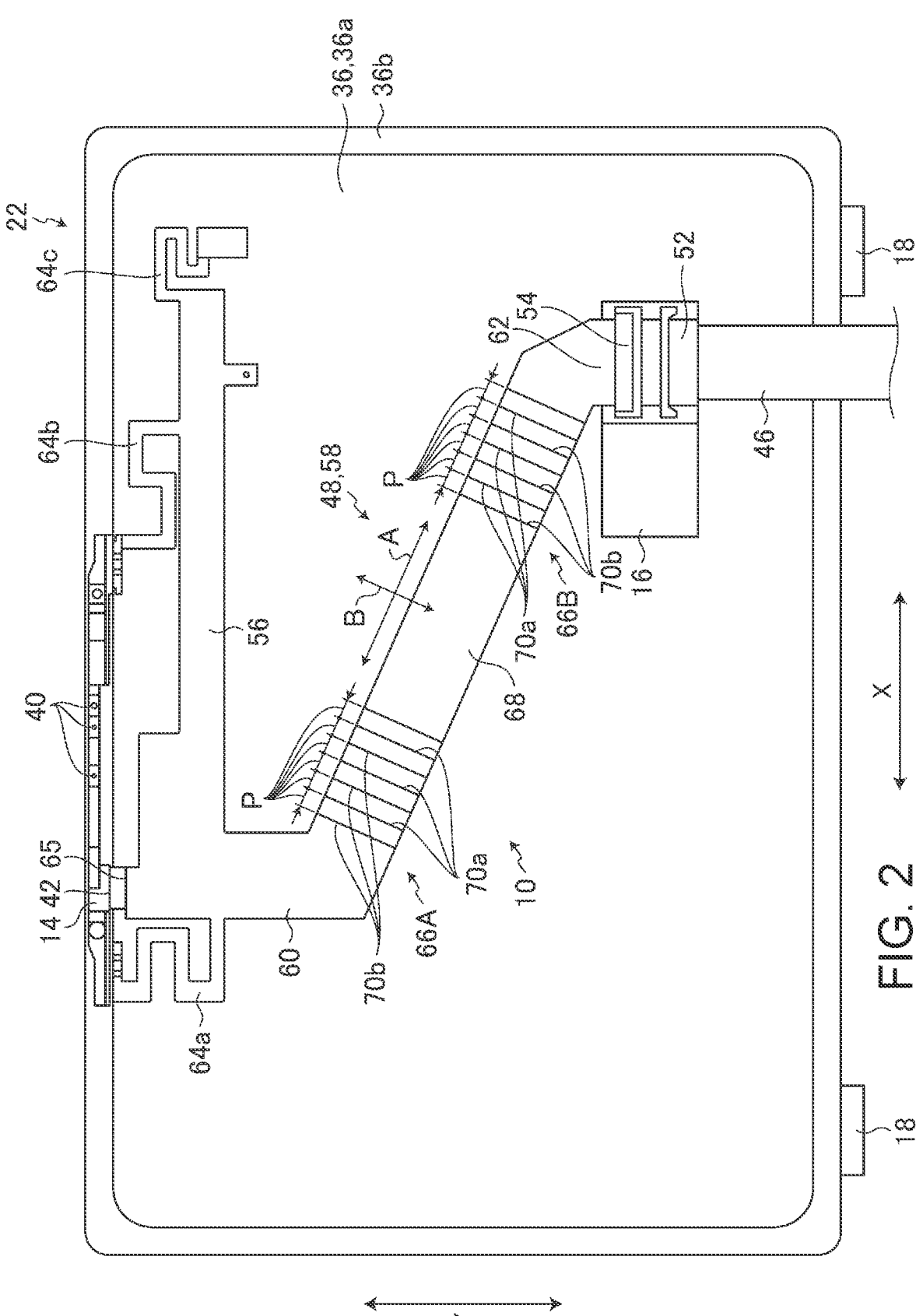
FIG. 2 is a front view of a display chassis in a state in which a display and a bezel have been removed.

FIG. 2 is a front view illustrating the display chassis 22 in a state in which the display 34 and the bezel 38 have been removed. Substantially the whole flat cable 48 is provided on the plane part 36a, and a laterally extending part 56 and an inclined part 58 form a roughly V-shape. The laterally extending part 56 lies along the upper side of the display chassis 22. The inclined part 58 extends diagonally at an angle from an upper left position relative to the center toward the lower right inside the display chassis 22. The direction in which the inclined part 58 extends is defined as an A-direction. The laterally extending part 56 and the inclined part 58 are connected via a short first longitudinally extending part 60 that extends in the Y-direction at an upper left position relative to the center inside the display chassis 22.

The connectors 42, 52, and 54 are laterally elongated in the X-direction, and the connection terminals thereof are arranged in parallel in the X-direction. The first longitudinally extending part 60 of the flat cable 48 is connected to the connector 42 at an upper portion, and a plurality of signal lines are formed along the Y-direction in the first longitudinally extending part 60. Meanwhile, at a lower portion, the connector 54 is connected to a second longitudinally extending part 62. The second longitudinally extending part 62, which is very short, extends along the Y-direction. The second longitudinally extending part 62 has a plurality of signal lines formed along the Y-direction. The inclined part 58 extends in the A-direction so as to connect the first longitudinally extending part 60 and the second longitudinally extending part 62 at a shortest distance, and the inclined part 58 has a plurality of signal lines formed along the A-direction. In other words, the connector 42 and the connector 54 are shifted in the X-direction and the Y-direction, and the inclined part 58 connects the connector 42 and the connector 54 diagonally via the first longitudinally extending part 60 and the second longitudinally extending part 62. The flat cable 46 connected to the connector 52 extends in the Y-direction.

The laterally extending part 56 is provided with thin and short branch portions 64a, 64b, and 64c. A light emitting element, a sensor, and the like are mounted on the tips of the branch portions 64a, 64b, and 64c. The branch portions 64a, 64b, and 64c each form an S-shape along the plane part 36a, and the S-shaped portions slightly deform, thereby allowing the misalignment of the arrangement of the tips to be accommodated. The branch portions 64a, 64b, and 64c are short, so that the path length will not become excessively long even if the S-shapes are formed, and the thinness thereof allows the deformation due to the S-shapes. A short relay part 65 is provided at the left end of the laterally extending part 56. The relay part 65 connects the connector 42 and the laterally extending part 56 in the Y-direction. The inclined part 58 is slightly thicker than the laterally extending part 56, and specifically, has a thickness that is approximately the sum of the laterally extending part 56 and the branch portions 64a to 64c, and is the thickest portion of the flat cable 48.

The connection structure 10 according to the present embodiment is adapted to connect the connector 42 of the electronic board 14 and the connector 54 of the electronic board 16 by the flat cable 48. Fold line groups 66A, 66B described below are formed on the inclined part 58 of the flat cable 48.

Figure 3:
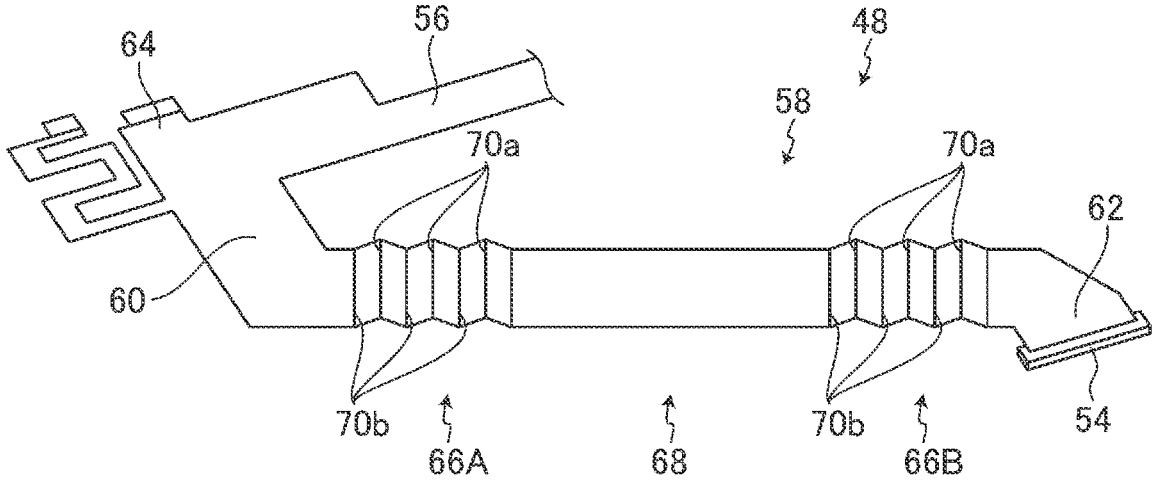
FIG. 3 is a perspective view of an inclined part in a flat cable.
Figure 4:
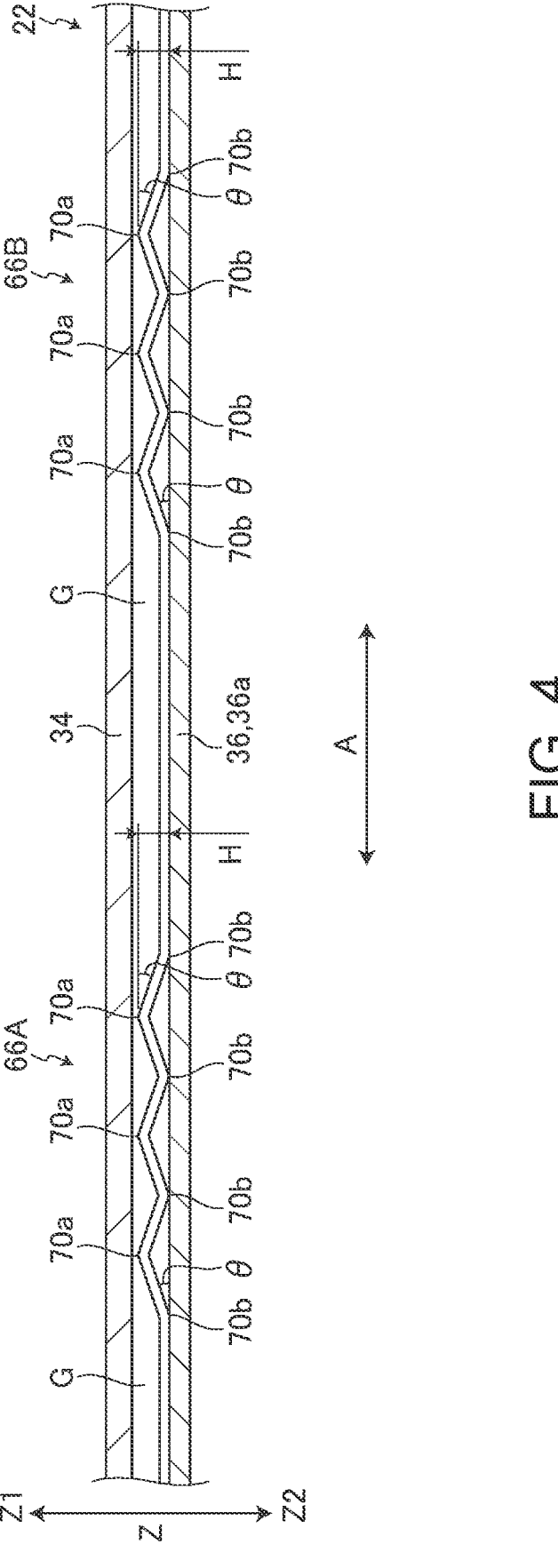
FIG. 4 is a sectional view of the inclined part and the surroundings thereof in the display chassis.

FIG. 3 is a perspective view of the inclined part 58 in the flat cable 48. FIG. 4 is a sectional view of the inclined part 58 and the surroundings thereof in the display chassis 22. As illustrated in FIG. 2 to FIG. 4, two fold line groups 66A, 66B are formed in the inclined part 58. The fold line group 66A and the fold line group 66B are formed at different places, but have the same configuration. The fold line group 66A is located near the first longitudinally extending part 60, and the fold line group 66B is located near the second longitudinally extending part 62. There is a flat portion 68 between the fold line group 66A and the fold line group 66B. The flat portion 68 is slightly longer than the fold line groups 66A, 66B. The flat portion 68 is used, for example, to adhesively fix the flat cable 48 to the rear cover 36 after placement and positioning. The specifications, the model number, and the like of the flat cable 48 may be printed on the flat portion 68.

In the fold line groups 66A, 66B, a plurality of ridge fold lines 70a, which protrude toward the surface on a Z1 side, and valley fold lines 70b, which recede toward the surface on the Z1 side and protrude toward the surface on a Z2 side, are alternately provided. The ridge fold lines 70a and the valley fold lines 70b are formed at regular intervals P. Being different from curved lines having an indefinite shape, the ridge fold lines 70a and the valley fold lines 70b have stable line shapes.

The ridge fold lines 70a and the valley fold lines 70b are each formed along a B-direction, which is orthogonal to an A-direction, in the inclined part 58. As illustrated in FIG. 4, an angle θ of the ridge fold lines 70a and the valley fold lines 70b with respect to an extending surface of the inclined part 58 (the extending surface coinciding with the plane part 36a in this case) is small, and is approximately 20 degrees in the present embodiment, thus keeping a height H of the fold line group 66A and the fold line group 66B low. In order to reduce the height H, the angle θ should be 45 degrees or less, more preferably 12 degrees or less. The height H is, for example, 2 mm or less, more preferably 1.2 mm or less.

As described above, since the height H is kept low, the fold line group 66A and the fold line group 66B can be placed in a narrow space G (refer to FIG. 4) between the display 34 and the rear cover 36 inside the display chassis 22. The inclined part 58 has the fold line groups 66A, 66B formed thereon and takes a path that slightly rises and falls in the Z-direction, so that the apparent length in plan view is slightly smaller than that without the fold line groups 66A, 66B, the difference being approximately 2 mm in the present embodiment. The inclined part 58 is adapted to accommodate the misalignment between both ends thereof by the difference in the length. The ridge fold lines 70a and the valley fold lines 70b may be formed by an automatic machine or a jig, or manually formed by an operator. The inclined part 58 may be printed in advance with lines serving as marks at the locations where the ridge fold lines 70a and the valley fold lines 70b are to be formed. The above-described intervals P are, in the strict sense, the distances along the angle θ; however, in FIG. 2 and FIG. 5, which will be described next, the intervals P are shown as distances in plan view to avoid complication in the illustration. The same applies to intervals P0 to be described later.

Figure 5:
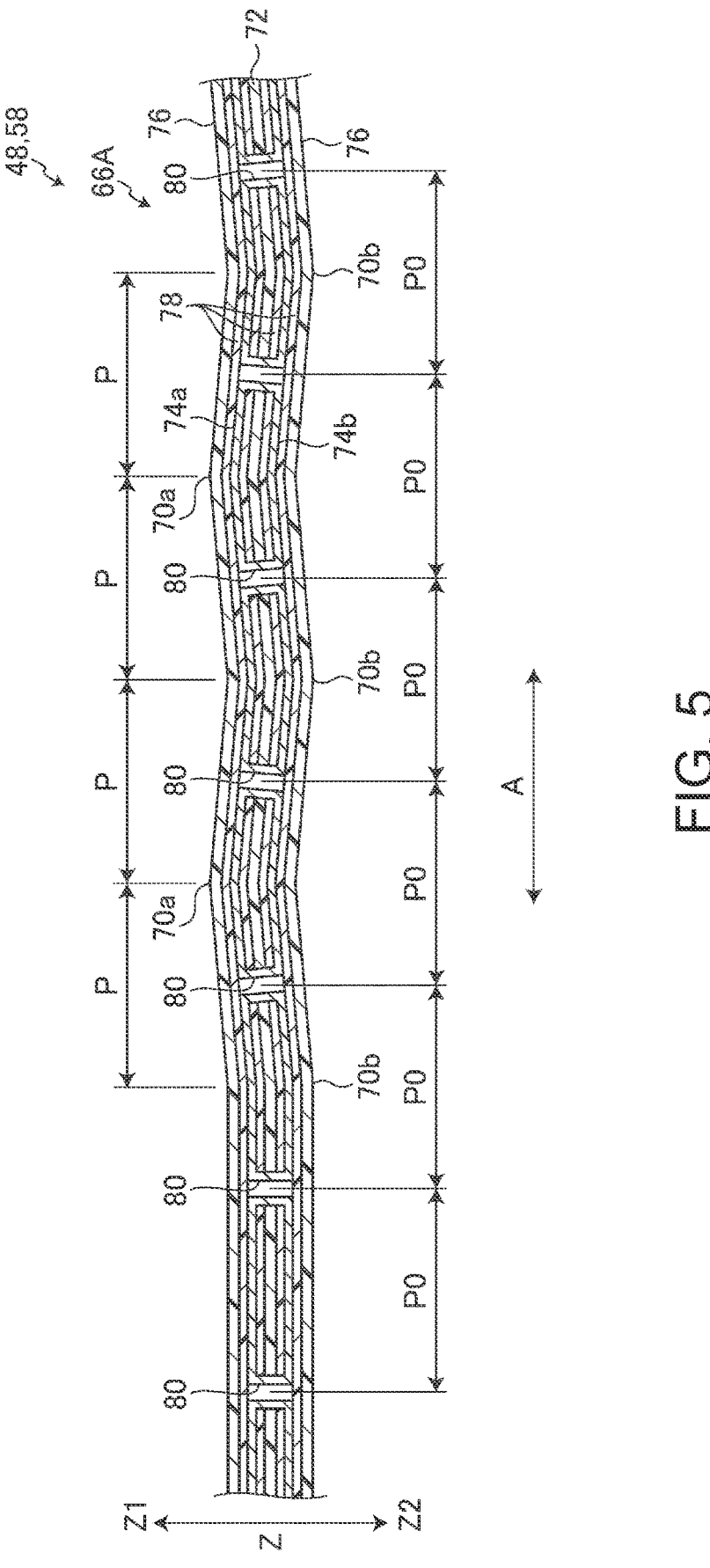
FIG. 5 is a sectional view of the part of a fold line group in the inclined section of the flat cable.

FIG. 5 is a sectional view of the section of the fold line group 66A in the inclined part 58 of the flat cable 48. The same applies to the section of the fold line group 66B.

The flat cable 48 has a structure in which copper foil layers 74a, 74b are formed on the front and back of a base film 72 in a center layer, and the front and back are further covered with a cover film 76. Each layer is fixed with adhesives 78. A plurality of the copper foil layers 74a, 74b are provided according to the number of signal lines, FIG. 5 representatively illustrating ground lines. In the flat cable 48, two layers of the ground lines are connected by through holes 80 to strengthen the ground and improve noise resistance performance. A plurality of the through holes 80 are provided along the A-direction at intervals P0 over at least the entire length of the inclined part 58.

In the fold line groups 66A, 66B, the through holes 80 are provided at the middle position between the ridge fold lines 70a and the valley fold lines 70b. In other words, the ridge fold lines 70a and the valley fold lines 70b are formed at positions free of the through holes 80, the intervals P being equal to the intervals P0 of the through holes 80. This configuration prevents the ridge fold lines 70a and the valley fold lines 70b from damaging the through holes 80. The intervals P between the ridge fold lines 70a and the valley fold lines 70b are set at appropriate distances. Although the flat cable 48 in the present embodiment has two layers, the number of the layers may be three or more. In such a case, the through holes 80 should conduct any two or more layers of three or more layers.

Figure 6:
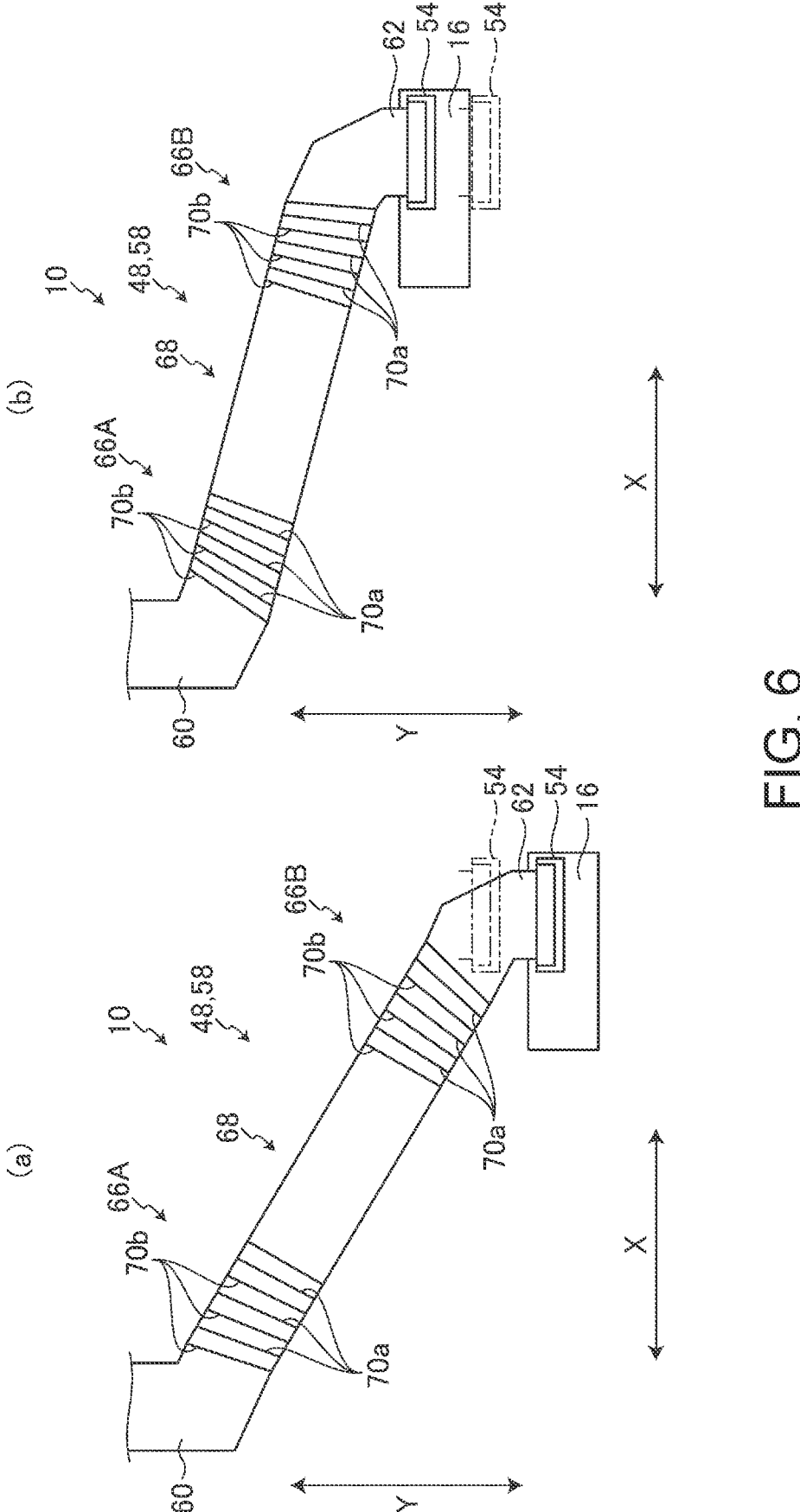
FIG. 6 presents schematic diagrams illustrating a connection structure in the case where a connector has been provided at the positions indicated by the solid lines, which are deviated from the normal positions indicated by the virtual lines, wherein (a) illustrates the case where the connector has been deviated upward, and (b) illustrates the case where the connector has been deviated downward.

FIG. 6 presents schematic diagrams illustrating the connection structure 10 in the cases where the connector 54 has been provided at positions deviated to the positions indicated by the solid lines from the normal positions indicated by the virtual lines, wherein (a) illustrates the case where the connector 54 has been deviated upward, and (b) illustrates the case where the connector 54 has been deviated downward. There are cases where, depending on an operator, the electronic board 16 is fixed with a slight deviation when adhesively fixing the electronic board 16 to the plane part 36a. This causes the connector 54 of the electronic board 16 to be also deviated from the normal position, as illustrated in FIG. 6.

As illustrated in FIG. 6(a), if the connector 54 is deviated downward (toward the main body chassis 24), the spacing of the plurality of the ridge fold lines 70a and the valley fold lines 70b in the fold line groups 66A, 66B becomes apparently relatively wider in the upper right portion than in the lower left portion in plan view. Although not illustrated, the same applies to the case where the connector 54 is deviated to the left and the case where the connector 54 is deviated clockwise.

As illustrated in FIG. 6(b), if the connector 54 is deviated upward, the spacing of the plurality of the ridge fold lines 70a and the valley fold lines 70b in the fold line groups 66A, 66B becomes apparently relatively wider in the lower left portion than in the upper right portion in plan view. Although not illustrated, the same applies to the case where the connector 54 is deviated to the right and the case where the connector 54 is deviated counterclockwise.

Further, if the connector 54 is deviated in an upper left direction, the spacing between the ridge fold lines 70a and the valley fold lines 70b in plan view decreases, and if the connector 54 is deviated in a lower right direction, the spacing between the ridge fold lines 70a and the valley fold lines 70b in plan view increases.

Thus, even if a relative misalignment occurs between the connector 42 and the connector 54, the connection structure 10 and the electronic apparatus 11 according to the present embodiment can connect the two connectors, accommodating the misalignment.

Further, according to such fold line groups 66A, 66B, instead of forming the S-shapes by two folded portions on the Y-Z plane like the extra length portions in Japanese Patent No. 6922037, the ridge fold lines 70a and the valley fold lines 70b form W-shapes on the A-Z plane so as to reduce the height H, thus enabling the placement in the narrow space G.

In addition, according to the fold line groups 66A, 66B, instead of forming the S-shapes of the long paths along the plane part 36a on the X-Y plane like the branch portions 64a to 64c, the connector 42 and the connector 54 are connected with the short paths that form the W-shapes on the A-Z plane, thereby making it possible to shorten the signal length. The S-shapes on the X-Y plane are effective for the thin portions such as the branch portions 64a to 64c, while the fold line groups 66A, 66B are effective for the inclined part 58, which is thick. It is needless to say that the same configuration as that of the fold line groups 66A, 66B may be applied to the branch portions 64a to 64c.

If the fold line groups 66A, 66B were formed to have curved shapes without the fold lines, then the curved portions would generate forces for returning to the original shapes, depending on the elasticity of the curved portions, which would inconveniently apply a pressure to the connector 54. On the other hand, the fold line groups 66A, 66B have the ridge fold lines 70a and the valley fold lines 70b, and these fold lines make the apparent length of the flat cable 48 slightly shorter accordingly in a stable manner, thus hardly applying a pressure to the connector 54.

Further, if the fold line groups 66A, 66B were to have a curved shape without fold lines, the fold line groups 66A, 66B would have a large arc shape in an A-Z plan view, would be sandwiched between the plane part 36*a* (refer to FIG. 4) and the display 34, and would be subjected to stress. On the other hand, the fold line groups 66A, 66B have the reduced height H and are hardly subjected to stress from the plane part 36*a* and the display 34.

The connection structure 10 is adapted to connect the electronic board 14 and the electronic board 16, which are objects to be connected, by a flat cable. The connector 42 is used for connection to the electronic board 14, and the connector 54 is used for connection to the electronic board 16; however, the connection is not limited to connectors, and may alternatively be pressure welding, solder fusion, direct bonding, dimple connection, or the like. Further, in the above-described embodiment, the three ridge fold lines 70*a* and the four valley fold lines 70*b* are provided in each of the fold line groups 66A, 66B; however, depending on design conditions, a reasonable extra length accommodation effect is obtained by providing one or more fold lines in each of the ridge fold lines 70*a* and the valley fold lines 70*b*. The ridge fold lines 70*a* and the valley fold lines 70*b* are each formed along the B-direction, which is orthogonal to the A-direction, in the inclined part 58; however, depending on design conditions, a reasonable extra length accommodation effect is obtained by forming the ridge fold lines 70*a* and the valley fold lines 70*b* along a direction intersecting with the A-direction. The flat cables 46, 48 may be FFCs (Flexible Flat Cables) or the like.

The present invention is not limited to the above-described embodiment, and may obviously be changed freely within a scope that does not deviate from the gist of the present invention.

The invention claimed is:

1. An electronic apparatus having a flat display chassis including a display and a rear cover that covers a surface opposite from a display surface of the display, the electronic apparatus comprising:

a flat cable that connects a first connection object and a second connection object in a space between the display and the rear cover, wherein the flat cable has a ridge fold line that protrudes toward one surface of the flat display chassis and a valley fold line that protrudes toward another surface of the flat display chassis, the ridge fold line and the valley fold line extend along a direction intersecting with an extending direction, wherein the flat cable includes a diagonal section that runs along a diagonal direction which is coplanar with the display and diagonal with respect to a width and a length of the flat display chassis, and wherein the ridge fold line and the valley fold line are disposed in at least the diagonal section of the flat cable.

2. The electronic apparatus according to claim 1, further comprising:

a plurality of ridge fold lines and a plurality of valley fold lines are alternately disposed.

3. The connection structure according to claim 1, wherein the ridge fold line and the valley fold line have angles of 45 degrees or less with respect to an extending surface of the inclined part.

4. An electronic apparatus having a flat display chassis including a display and a rear cover that covers a surface opposite from a display surface of the display, the electronic apparatus comprising:

a flat cable that connects a first connection object and a second connection object in a space between the display and the rear cover, wherein the flat cable has a ridge fold line that protrudes toward one surface of the flat display chassis and a valley fold line that protrudes toward another surface of the flat display chassis, the ridge fold line and the valley fold line extend along a direction intersecting with an extending direction, wherein the flat cable has:

copper foil in each of a plurality of layers; and a plurality of through holes are at predetermined intervals and connect the copper foil between the plurality of layers, and the ridge fold line and the valley fold line are at positions offset from the through holes and at predetermined intervals.

5. The electronic apparatus according to claim 4, further comprising:

a plurality of ridge fold lines and a plurality of valley fold lines are alternately disposed.

6. The electronic apparatus according to claim 4, wherein the ridge fold line and the valley fold line have angles of 45 degrees or less with respect to an extending surface of the inclined part.

7. A connection structure for connecting a first connection object and a second connection object by a flat cable, comprising:

a ridge fold line that protrudes toward one surface of a chassis and a valley fold line that protrudes toward another surface of the chassis are in the flat cable along a direction intersecting with an extending direction;

a first connection connected to the flat cable in the first connection object and a second connection connected to the flat cable in the second connection object have shapes elongated in a first direction, the first connection and the second connection are at positions offset in the first direction and at positions offset in a second direction orthogonal to the first direction, the flat cable has a linear inclined part that is inclined with respect to the first direction and the second direction, and the ridge fold line and the valley fold line are in the inclined part along a direction orthogonal to the extending direction.

* * * * *